United States Patent [19]

Chen et al.

[11] Patent Number: 5,990,246

[45] Date of Patent: Nov. 23, 1999

[54] TRANSPARENT MATERIALS CONSISTING OF HYDROGENATED PRODUCTS OF RING-OPENED METATHETICAL POLYMERS WITH POLAR SUBSTITUENTS

[75] Inventors: Yun Chen, Krefeld; Ralf Dujardin, Willich; Friedrich-Karl Bruder, Krefeld; Johann Rechner, Kempen, all of Germany

[73] Assignee: Bayer AG, Leverkusen, Germany

[21] Appl. No.: 08/991,370

[22] Filed: Dec. 16, 1997

[30] Foreign Application Priority Data

Dec. 23, 1996 [DE] Germany .......................... 196 54 076

[51] Int. Cl.$^6$ ...................................................... C08F 8/04
[52] U.S. Cl. ........................ 525/332.1; 525/338; 525/339
[58] Field of Search ..................................... 525/338, 339, 525/332.1

[56] References Cited

FOREIGN PATENT DOCUMENTS 1546775  5/1979  United Kingdom .

OTHER PUBLICATIONS

Derwent Abstract, JP 04 277 519n Oct., 1992.
Patent Abstract of Japan, vol. 009, No. 180, Jul. 25, 1985, Publ. No. 02103226, Apr. 16, 1990.
Patent Abstract of Japan, vol. 014, No. 306, Jul. 3, 1990, Publ. No. 60049051, Mar. 18, 1985.
Patent Abstract of Japan, vol. 104, no. 106, Feb. 27, 1990, Publ. No. 01311120, Dec. 15, 1998.

*Primary Examiner*—Bernard Lipman
*Attorney, Agent, or Firm*—Connolly Bove Lodge & Hutz LLP

[57] ABSTRACT

Hydrogenation products of copolymers prepared by ring-opening metathetical polymerisation of a cyano-substituted norbornene and at least one multicyclic olefin, which contains 95.5 to 5 wt. % of the cyano-substituted norbornene incorporated in the polymer and in which at least 60% of the initially present olefinic double bonds have been saturated by hydrogenation and the preparation of the new hydrogenation products by polymerisation in the presence of a catalyst and optionally a chain transfer agent at −20° C. to 100° C. at atmospheric pressure in an inert solvent, followed by hydrogenation in the presence of a homogeneous or heterogeneous hydrogenation catalyst at 0° C. to 200° C. under a hydrogen pressure of 2 to 200 bar in an inert solvent.

12 Claims, No Drawings

TRANSPARENT MATERIALS CONSISTING OF HYDROGENATED PRODUCTS OF RING-OPENED METATHETICAL POLYMERS WITH POLAR SUBSTITUENTS

The invention relates to transparent materials consisting of hydrogenated products of ring-opened metathetical polymers (ROMP polymers) with polar substituents. These materials can be processed to give moulded items by means of extrusion or injection moulding and are particularly suitable as substrates for optical data storage facilities such as compact discs, video discs, rewritable optical discs.

Transparent plastic materials such as aromatic polycarbonate, polymethylmethacrylate or polystyrene can be used as substrates for data storage facilities. Addition copolymers made from ethylene and a norbornene derivative or a tetracyclododecene derivative and also hydrogenated products of ring-opened metathetical polymers made from norbornene or tetracyclododecene derivatives are also suitable.

For very high density data storage (>10 Gbytes per disc with a diameter of 120 mm), however, none of the current substrate materials can be used without restrictions because very low birefringence and water absorption, high dimensional stability at elevated temperature, very good mechanical properties and low melt viscosity are all simultaneously required for this purpose. Although aromatic polycarbonates have very good mechanical properties and dimensional stability at elevated temperature, they have a too high birefringence and water absorption. Polystyrene has a too high birefringence and a too low dimensional stability at elevated temperature. Polymethylmethacrylate has a too high water absorption and a too low dimensional stability. Addition copolymers made from ethylene and a non-polar norbornene or tetracyclodocene derivative have a low birefringence and almost no water absorption, but inadequate mechanical properties. Hydrogenated ROMP polymers disclosed hitherto still have a too high birefringence and, when using a polar substituted monomer (e.g. containing ester groups), have a too high water absorption.

EP 0 317 262 describes only hydrogenated ROMP polymers made from tetracyclododecene derivatives with an ester group, e.g. 8-methyl-8-methoxycarbonyltetracyclododecene. The ester groups are used in particular to improve the adhesion of metal layers.

The ROMP homopolymer made from 5-cyanonorbornene and a process for its preparation is described in DE-A 23 16 087. This polymer has very good mechanical properties (elongation at break comparable to that of aromatic polycarbonates). The hydrogenated ROMP homopolymer made from 5-cyanonorbornene and the corresponding hydrogenated copolymers with other monocyclic olefins or a few selected norbornene derivatives are also known (JP 63-317 520).

Hydrogenated ROMP copolymers made from a cyano-substituted norbornene and at least one other ring-strained multicyclic olefin without polar substituents satisfy the requirements for optical and mechanical properties, water absorption and thermal properties.

The invention provides hydrogenation products of copolymers prepared by ring-opening metathetical polymerisation from a cyano-substituted norbornene of the formula (1) and at least one of the multicyclic olefins of the formula (2) and (3),

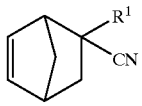
(1)

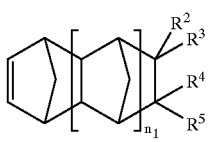
(2)

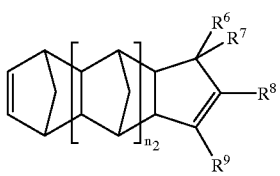
(3)

wherein
R$^1$ represents H, methyl, ethyl or cyano;
R$^2$ to R$^9$, independently of each other, represent H or a C$_1$–C$_6$-alkyl, C$_1$–C$_6$-alkenyl or C$_6$–C$_{10}$-aryl group;
R$^2$ and R$^3$ together may also represent an alkylidene group and
R$^8$ and R$^9$ together may also represent the remainder of a benzene ring;
n$_1$ is 1 or 2;
n$_2$ is 0, 1 or 2,
which contains 99.5 to 5 wt. % of the cyano-substituted norbornene incorporated by polymerisation and in which at least 60% of the initially present olefinic double bonds have been saturated by hydrogenation.

The following are preferred
R$^1$ represents H or methyl;
R$^2$ to R$^9$, independently of each other, represent H, methyl or phenyl;
R$^2$ and R$^3$ together represent ethylidene;
R$^8$ and R$^9$ together represent the remainder of a benzene ring;
n$_1$ is 1,
n$_2$ is 0 or 1
with a content of cyano-substituted norbornene of 60% to 20% incorporated by polymerisation and with hydrogenation of at least 95% of the olefinic double bonds.

Cyano-substituted norbornenes of the formula (1) are known. Examples are:
5-cyanonorbornene-2,
5-methyl-5-cyanonorbornene-2,
5,5-dicyanonorbornene-2.

Compounds of the formula (2) and (3) are also known. Examples of formula (2) are:
1,4,5,8-dimethano-1,4,4a,5,6,7,8,8a-octahydronaphthalene,
6-methyl-1,4,5,8-dimethano-1,4,4a,5,6,7,8,8a-octahydronaphthalene,
6-ethyl-1,4,5,8-dimethano-1,4,4a,5,6,7,8,8a-octahydronaphthalene,
6-ethylidene-1,4,5,8-dimethano-1,4,4a,5,6,7,8,8a-octahydronaphthalene,
6-phenyl-1,4,5,8-dimethano-1,4,4a,5,6,7,8,8a-octahydronaphthalene, 6,7-dimethyl-1,4,5,8-dimethano-1,4,4a,5,6,7,8,8a-octahydronaphthalene, and examples of formula (3) are:

dicyclopentadiene, tricyclopentadiene, tetracyclopentadiene, 1,4-methano-1,4,4a,9a-tetrahydrofluorene.

The invention also relates to a process for preparing the hydrogenation products, characterised in that, 1. the cyano-substituted norbornene of the formula (1) and at least one of the multicyclic olefins of the formula (2) and (3) are subjected to ring-opening metathetical polymerisation in the presence of a catalyst and optionally in the presence of a chain transfer agent (to adjust the molecular weight) at −20° C. to 100° C., preferably 0° C. to 50° C., under atmospheric pressure in an inert solvent, and then 2. the polymer obtained is hydrogenated in the presence of a homogenous or heterogeneous hydrogenation catalyst at 0° C. to 200° C., preferably 35° C. to 150° C., under a hydrogen pressure of 2 to 200 bar, preferably 10 to 50 bar, in an inert solvent.

The polymer can be isolated by known methods, for example by precipitation from the polymer solution with lower aliphatic alcohols or by passing the polymer solution into hot water (stripping).

Isolation of the polymer prior to hydrogenation, however, is not absolutely necessary. The reaction mixture may preferably be directly subjected to hydrogenation. In this case, the same solvent is preferably used for both polymerisation and hydrogenation.

Suitable chain transfer agents for ring-opening metathetical polymerisation are compounds with carbon-carbon double bonds. Examples are $C_1$–$C_{12}$-alkenes, allyl acetate, allyl alkyl ethers, styrene.

Suitable catalysts for ring-opening polymerisation are a) compounds of the transition metals tungsten, rhenium, tantalum, molybdenum, b) organometallic compounds of metals from Groups IA to IVA in the Periodic System of Elements (D. F. Shriver, P. W. Atkins, C. H. Langford, Anorganische Chemie, VCH Verlagsgesellschaft, 1992) and c) optionally cocatalysts.

a) is preferably $TaBr_5$, $TaCl_5$, $ReCl_5$, $MoOCl_3$, $MoOCl_5$, $WCl_5$, $WCl_6$, $WOCl_4$, tungsten halides being particularly preferred.

b) is preferably an aluminium trialkyl, aluminium dialkyl halide, aluminium alkyl dihalide, magnesium alkyl halide, lithium alkyl or tin tetraalkyl, wherein preferred alkyl groups contain 1 to 8 carbon atoms and chlorine and bromine are preferred as the halogen. Examples are: LiBu, $MgEt_2$, $AlEt_3$, $AlEtCl_2$, $AlEt_2Cl$, $SnEt_4$, $SnBu_4$. Organoaluminium compounds and organotin compounds are preferred.

The effectiveness of organometallic catalyst mixture can be increased by adding cocatalysts (c). Suitable cocatalysts are:

Epoxides of the general formula (4)

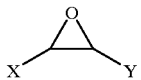

(4)

in which X and Y represent H or an alky, aryl, aralkyl or —$CH_2$—Hal (Hal=F, Cl, Br, I) group;
or acetals of the general formula (5)

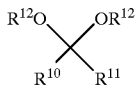

(5)

in which
$R^{10}$ and $R^{11}$, independently of each other, represent hydrogen, an optionally halogenated alkyl, aryl or alklaryl group and
$R^{12}$ represents a halogen-containing alkyl group;
or halogenated alcohols of the general formula (6)

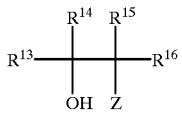

(6)

in which
Z represents a halogen atom (F, Cl, Br),
$R^{13}$ and $R^{14}$ may be identical or different and represent hydrogen or an alkyl, aryl or aralkyl group,
$R^{15}$ and $R^{16}$ are identical or different and represent F, Cl, Br, I, H or an alkyl, aryl or aralkyl group and in which $R^{14}$ and $R^{15}$ together, and with the carbon atom to which they are attached, may form a carbon ring with 5 or more members;
or ethers of the general formula (7)

$$X_1-(CH_2)_n-O-(CH_2)_n-X_2 \quad (7)$$

in which
$X_1$ and $X_2$=H, F, Cl, Br, I and
n maybe 1 to 10;
or ketones of the general formula (8)

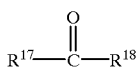

(8)

in which $R^{17}$ and $R^{18}$ may be identical or different and represent optionally halogen-containing alkyl groups.

In the co-catalysts, alkyl groups are preferably those with 1 to 6 carbon atoms, aryl groups are preferably those with 6 to 10 atoms and aralkyl groups are preferably a combination of the two.

Examples of these co-catalysts are ethylene oxide, propylene oxide, 2-chloroethanol, 2-bromoethanol, 2-fluoroethanol, 2-iodoethanol, 2-chlorocyclohexanol, 2-chlorocyclopentanol, o-, m- and p-chlorophenol, di-2-chloroethylformaldehyde, diethyl ether, dibutyl ether, di-(chloroethyl) ether, acetaldehyde-diethylacetal, acetone and butanone.

The preferred molar ratio of catalyst components (a):(b) and (a):(c) is 1:0.5 to 1:15 and 1:0.3 to 1:10 respectively.

The amount of catalyst component (a) is preferably 0.05 to 2 mmol, preferably 0.1 to 0.5 mmol, to 100 g of monomers.

In a preferred embodiment of the polymerisation, catalyst component (a), preferably a halide, is first reacted with co-catalyst (c) in 0.05 to 0.5 molar solution in hydrocarbons or halogenated hydrocarbons. Stable reaction products which are readily soluble in organic solvents are then obtained. Suitable solvents for the process are aliphatic, cycloaliphatic and aromatic hydrocarbons, optionally halogenated, such as for example, toluene, methylene chloride, hexane and cyclohexane. Toluene is preferred.

Polymerisation is generally performed in accordance with the invention as follows: the monomers are usually dissolved in an inert solvent with the exclusion of water, H-acidic compounds and oxygen. The concentration of monomers may be 5 to 60 wt. %, concentrations of 5 to 30 wt. % being preferred. In a batchwise procedure, the transition metal compound (a) or the reaction product of (a) and (c) is added first, followed by the organo-metallic compound (b). The sequence, however, is not critical. Reaction proceeds slightly exothermically. The reaction time may extend from a few minutes to a few hours.

Suitable solvents for the solution polymerisation process are aliphatic, cycloaliphatic and aromatic hydrocarbons, optionally halogenated, such as for example toluene, methylene chloride, hexane and cyclohexane. Toluene is preferred.

Hydrogenation of the polymers prepared by ring-opening metathetical polymerisation is possible using methods known per se which can also be used for the normal hydrogenation of olefins.

Suitable heterogeneous hydrogenation catalysts are, for example, palladium, platinum, nickel, rhodium or ruthenium on activated carbon, aluminium oxide, silica gel, barium sulphate or calcium carbonate as support.

Homogeneous catalysis is preferred for the hydrogenation process. Suitable homogeneous hydrogenation catalysts are, for example, ruthenium phosphine complexes which are described in Inorganic Synthesis, vol. 15, page 45; J. Chem. Soc., Dalton Trans. (1973) 1912; Rec. Trav. Pays Bas, 91 (1972) 591; J. Chem. Soc., Dalton Trans. (1973) 478; Adv. in Chem. Ser., 196 (1982) 145; Inorg. Chim. Acta., 32 (1979) 19 and J. Inorg. and Nuc. Chem., 36 (1974) 2279. Examples are $RuHCl(CO)(PPh_3)_3$, $RuHCl(CO)(P(C_4H_9)_3)_3$, $RuH_2(CO)(PPh_3)_3$, $RuH_2(CO)_2(PPh_3)_2$, $RuH_2(NO)(PPh_3)_3$, $RuHCl(CO)(PCyclohexyl_3)_2$, $RuHCl(CO)(PCycohexyl_3)$ $RuHCl(CO)_2(PCyclohexyl_3)_2$.

The organic solvent for polymerisation, mentioned above, may generally also be used for hydrogenation. In general, 5 to 60 wt. % strength solutions, preferably 5 to 30 wt. % strength solutions, with reference to polymer, are used. The amount of homogeneous catalyst is 0.001 to 2 wt. %, preferably 0.01 to 1 wt. %, with reference to polymer. The hydrogenation time may be 0.5 to 24 hours.

Polymerisation and hydrogenation may be performed either batchwise or continuously, for example in a stirred tank cascade or in a reactor extruder.

Hydrogenated ROMP polymers according to the invention may be protected from ageing by the addition of anti-oxidants, for example sterically hindered phenol.

Hydrogenated ROMP polymers according to the invention may also contain other additives such as, for example, UV absorbers, colorants, pigments, etc., whatever the intended application.

Hydrogenated ROMP polymers according to the invention have an average molecular weight (weight average), determined by gel permeation chromatography with polystyrene as the calibrant, of 5 000 to 1 000 000, preferably 5 000 to 50 000. The molecular weight depends on the operating parameters, in particular the catalyst composition, monomer/catalyst ratio and monomer/chain transfer agent ratio and can be adjusted to a desired value by changing these parameters.

Hydrogenated ROMP polymers according to the invention have a glass transition temperature, determined by differential thermal analysis, of 50° C. to 300° C., preferably 120° C. to 180° C. The glass transition temperature depends in particular on the catalyst composition and monomer/comonomer ratio and can be adjusted to a desired value by changing these parameters.

Birefringence of injection moulded items, one of the most important optical properties, can be described by the rheooptical constant as a material property. This may be positive or negative. The larger its absolute value, the greater is the birefringence of injection moulded articles. The method of measurement of the rheooptical constant is known (EP-A-0 621 297, page 4, lines 36 to 45). The plane-parallel 150 to 1000 micrometer specimens required for this can be prepared by melt compression moulding or film-casting.

Hydrogenated ROMP polymers according to the invention have a rheooptical constant of at most 2.0 $GPa^{-1}$. The rheooptical constant depends in particular on the type of monomer used and the monomer/comonomer ratio and can be affected by changing these parameters.

Traces of elements such as tungsten, aluminium, chlorine, ruthenium and phosphorus etc., which arise from the polymerisation or hydrogenation catalysts, can be removed by placing the hydrogenation products in contact with the aqueous solution of an organic or inorganic acid such as formic acid, acetic acid, propionic acid or hydrochloric acid, or with an activated solids absorber such as silica gel, kieselguhr, activated carbon or aluminum oxide.

Due to their structure, hydrogenated ROMP polymers according to the invention have especially good optical properties (high transparency and low birefringence), good mechanical properties and adequate resistance to moisture. They are amorphous and can be easily processed. They can be processed using conventional processes (such as injection moulding or extrusion) to give optical products (such as lenses, substrates for compact discs).

EXAMPLES

Example 1

Ring-opened Copolymer of 5-Cyanonorbornene and Tetracyclododecane (Molar Ratio 60:40)

(1) Preparing the Catalyst 3.97 g (10 mmol) of tungsten(VI) chloride is dissolved in 70 ml of toluene, under nitrogen. A solution of 2.36 g (20 mmol) of acetaldehyde-diethylacetal in 30 ml of toluene is added dropwise to this solution, with stirring, at 20 to 25° C. The hydrogen chloride produced is removed over the course of 3 hours by bubbling a stream of dry nitrogen through the solution. The tungsten concentration in the solution obtained is about 0.1 mol/l.

(2) Polymerisation

To a mixture of 4.76 g (40 mmol) of 5-cyanonorbornene, 2 ml (1 mmol) of a 0.5M solution of allyl ethyl ether in methylene chloride and 80 ml of tetrahydrofuran are added 3.3 ml (0.33 mmol) of the catalyst solution obtained under (1) and 1.3 ml (2.3 mmol) of a 1.8M solution of diethylaluminium chloride in toluene. Then a solution of 9.6 g (60 mmol) of tetracyclododecene in 40 ml of tetrahydrofuran is added dropwise over the course of 2 hours. The reaction mixture is stirred for a further three hours after this addition has terminated and polymerisation is then stopped with 1 ml of methanol. The viscous solution obtained contains about 12 g of polymer per 100 ml and may be used directly for hydrogenation. In order to isolate the polymer, the solution is added dropwise to methanol. The precipitated product is filtered under suction and then dried under vacuum. 13.7 g of polymer with an average molecular weight (weight average $\overline{M}_w$) of 30 800, an average molecular weight (number average $\overline{M}_n$) of 12 600 (measured by gel permeation chromatography with polystyrene as the calibrant) and a glass transition temperature of 178° C. (measured by differential thermal analysis) are obtained.

Example 2
Hydrogenation of the Copolymer in Accordance With Example 1

The polymer solution obtained in example 1 (about 120 ml) is placed in a high-pressure autoclave with a magnetic stirrer. The autoclave is rendered inert with nitrogen. 50 mg of $RuHCl(CO)(P(C_6H_5)_3)_3$ is added and hydrogen is introduced. The temperature is increased to 120° C. with stirring. The pressure at this temperature is 50 bar. The reaction mixture is stirred for 10 hours at this temperature. The mixture is cooled to room temperature and the solution is added dropwise to methanol. After filtering under suction and drying, 12.5 g of polymer are obtained. $^1H$ and $^{13}C$ NMR confirm complete hydrogenation (>99%) of the olefinic double bonds and retention of the cyano groups.

To purify the crude product, it is dissolved in chlorobenzene, 20 g of kieselguhr is added to the solution and the suspension is stirred for 30 min under reflux. This is filtered under suction while warm and the polymer is precipitated again in methanol.

The hydrogenation product is dissolved in toluene (concentration, 10 wt. %) and poured out into a wet film with a thickness of 500 μm. The film is dried under vacuum. The glass transition temperature of this film is determined as 141° C. and the rheooptic constant is 1.7 $GPa^{-1}$.

Example 3
Ring-opened Copolymer of 5-Cyanonorbornene and Tetracyclododecene (Molar Ratio 80:20)

The same procedure is used as in example 1, wherein, differently from example 1, 2.38 g (20 mmol) of 5-cyanonorbornene and 12.8 g (80 mmol) of tetracyclododecene are copolymerised. The viscous solution obtained therefrom contains about 13 g of polymer per 100 ml and can be used directly for hydrogenation. In order to isolate the polymer, the solution is added dropwise to methanol. The precipitated product is filtered under suction and dried under vacuum. 14.5 g of polymer with an average molecular weight (weight average $\overline{M}_w$) of 29 600, an average molecular weight (number average $\overline{M}_n$) of 202 000 and a glass transition temperature of 189° C. is obtained.

Example 4
Hydrogenation of the Copolymer in Accordance With Example 3

The solution obtained in example 3 (about 120 ml) is hydrogenated in the same way as described in example 2 for 10 hours under a hydrogen pressure of 50 bar. 13 g of polymer are obtained. $^1H$ and $^{13}C$ NMR confirm complete hydrogenation (>99%) of the olefinic double bonds and retention of the cyano groups.

Example 5
Ring-opened Copolymer of 5-Cyanonorbornene and Dicyclopentadiene (Molar Ratio 80:20)
(1) Preparing the Catalyst 3.97 g (10 mmol) of tungsten(VI) chloride is dissolved in 70 ml of toluene, under nitrogen. A solution of 3.48 g (60 mmol) of acetone in 30 ml of toluene is added dropwise to this solution at 20 to 25° C., with stirring. The hydrogen chloride produced is removed by bubbling a stream of dry nitrogen through the mixture for 3 hours. The tungsten concentration in the solution obtained is about 0.1 mol/l.

(2) Polymerisation

The same procedure is used as described in example 1, wherein, differently from example 1, 2.38 g (20 mmol) of 5-cyanonorbornene and 10.56 g (80 mmol) of dicyclopentadiene are copolymerised using the catalyst solution prepared in stage (1). The viscous solution obtained contains about 8 g of polymer per 100 ml and can be used directly for hydrogenation. In order to isolate the polymer, the solution is added dropwise to methanol. The precipitated product is filtered under suction and dried under vacuum. 10.4 g of polymer are obtained.

Example 6
Hydrogenation of the Copolymer in Accordance With Example 5

The solution obtained in example 5 (about 120 ml) is hydrogenated for 10 hours in the same way as described in example 2, at 120° C. and under a hydrogen pressure of 50 bar. 8.7 g of polymer are obtained. $^1H$ and $^{13}C$ NMR confirm complete hydrogenation (>99%) of the olefinic double bonds and retention of the cyano groups.

Example 7
Ring-opened Copolymer of 5-Cyanonorbornene and 7-Ethylidene-tetracyclododecene (Molar Ratio 80:20)

The same procedure is used as in example 1, wherein, differently from example 1, (20 mmol) of cyanonorbornene and 14.88 g (80 mmol) of 7-ethylidene-tetracyclododecene are copolymerised. The viscous solution obtained contains about 12 g of polymer per 100 ml and can be used directly for hydrogenation. In order to isolate the polymer, the solution is added dropwise to methanol. The precipitated product is filtered under suction and dried under vacuum. 15 g of polymer are obtained.

Example 8
Hydrogenation of the Copolymer in Accordance With Example 7

The solution obtained in example 7 (about 120 ml) is hydrogenated for 10 hours in the same way as described in example 2, at 120° C. and under a hydrogen pressure of 50 bar. 11.4 g of polymer are obtained. $^1H$ and $^{13}C$ NMR confirm complete hydrogenation (>99%) of the olefinic double bonds and retention of the cyano groups.

Comparison Example 1
Hydrogenation Product of the Ring-opened Polymer of 5-Cyanonorbornene (1) 3.3 ml (0.33 mmol) of the catalyst solution obtained in stage (1) of example 1 and 1.3 ml (2.3 mmol) of a 1.8M solution of diethylaluminium chloride in toluene are added to a mixture of 11.9 g (100 mmol) of 5-cyanonorbornene, 2 ml (1 mmol) of a 0.5M solution of allyl ethyl ether in methylene chloride and 80 ml of methylene chloride. The reaction mixture is stirred for another 12 hours after terminating the addition and polymerisation is stopped with 1 ml of methanol. The solution obtained is added dropwise to methanol. The precipitated product is filtered under suction and dried under vacuum. 10.5 g of polymer with an average molecular weight (weight average $\overline{M}_w$) of 323 000, an average molecular weight (number average $\overline{M}_n$) of 43 300 and a glass transition temperature of 119° C. are obtained.

(2) 10 g of the product obtained in (1) are dissolved in 100 ml of tetrahydrofuran in a high-pressure autoclave. The autoclave is rendered inert with nitrogen. 17 mg of RuHCl(CO)(PCyh$_3$)$_2$ (Cyh=Cyclohexyl) are added and the mixture is hydrogenated for 6 hours at 140° C. under a hydrogen pressure of 50 bar. The mixture is cooled to room temperature and the solution is added dropwise to methanol. After filtering under suction and drying, 9.6 g of polymer are obtained. $^1$H and $^{13}$C NMR confirm complete hydrogenation (>99%) of the olefinic double bonds and retention of the cyano groups. A 150 μm thick film of the hydrogenation product is obtained by melt compression moulding. A glass transition temperature of 69° C. and a rheooptical constant of 1.2 GPa$^{-1}$ are determined using this film.

Comparison Example 2
Hydrogenation Product of the Ring-opened Polymer of Tetracyclododecene (1) 3.8 ml (3.8 mmol) of a 1M solution of triethylaluminium, 1.4 ml (10 mmol) of triethylamine and 1.0 ml (1.0 mmol) of a 1M solution of titanium tetrachloride in toluene are added, in this sequence, to a mixture of 19.2 g (120 mmol) of tetracyclododecene, 2 ml (1 mmol) of a 0.5M solution of 1-hexene in toluene and 110 ml of toluene. The reaction mixture is stirred for another 3 hours and polymerisation is stopped with 1 ml of methanol. The viscous solution obtained is added dropwise to methanol. The precipitated product is filtered under suction and dried under vacuum. 19 g of polymer with an average molecular weight (weight average $\overline{M}_w$) of 23 300, an average molecular weight (number average $\overline{M}_n$) of 9 100 and a glass transition temperature of 222° C. are obtained.

(2) 19 g of the product obtained in (1) are dissolved in 200 ml of toluene in a high-pressure autoclave. The autoclave is rendered inert with nitrogen. 50 mg of RuH$_2$(CO)(PPh$_3$)$_2$ are added and the mixture is hydrogenated for 12 hours at 120° C. under a hydrogen pressure of 50 bar. The mixture is cooled to room temperature and the solution is added dropwise to methanol. After filtering under suction and drying, 18.8 g of polymer with a glass transition temperature of 167° C. are obtained. $^1$H and $^{13}$C NMR confirm complete hydrogenation (>99%) of the olefinic double bonds.

Comparison Example 3
Hydrogenation Product of the Ring-opened Polymer of 7-Ethylidene-tetracyclodecene (1) The same procedure is used as described in comparison example 2(1), wherein, differently from comparison example 2, 22.3 g (120 mmol) of 7-ethylidene-tetracyclododecene are homopolymerised. The solution obtained is added dropwise to methanol. The precipitated product is filtered under suction and dried under vacuum. 22 g of polymer with an average molecular weight (weight average $\overline{M}_w$) of 79 700 and an average molecular weight (number average $\overline{M}_n$) of 35 100 are obtained.

(2) 22 g of the product obtained in (1) are dissolved in 200 ml of toluene in a high-pressure autoclave. The autoclave is rendered inert with nitrogen. 50 mg. of RuH$_2$(CO)(PPh$_3$)$_2$ are added and the mixture is hydrogenated for 12 hours at 120° C. under a hydrogen pressure of 50 bar. The mixture is cooled to room temperature and the solution is added dropwise to methanol. After filtering under suction and drying, 21.4 g of polymer are obtained. 1H and 13C NMR confirm complete hydrogenation (>99%) of the olefinic double bonds. The hydrogenation product is dissolved in toluene (concentration is 10 wt. %) and cast into a wet film with a thickness of 500 μm. The film is dried under vacuum. A glass transition temperature of 145° C. and a rheooptical constant of 2.1 GPa$^{-1}$ are determined using this film.

Comparison Example 4
Polycarbonate Made From 2,2-Bis-(4-hydroxyphenyl)-propane

A 150 μm thick film of polycarbonate based on 2,2-bis-(4-hydroxyphenyl)-propane (Makrolon CD2005, Bayer AG) is prepared by melt compression moulding. A glass transition temperature of 142° C. and a rheooptical constant of 5.4 GPa$^{-1}$ are determined using this film.

We claim:

1. Hydrogenation products of copolymers prepared by ring-opening metathetical polymerisation from a cyano-substituted norbornene of the formula (1) and at least one of the multicyclic olefins of the formula (2) and (3),

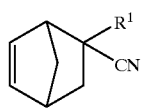

(1)

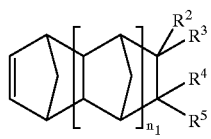

(2)

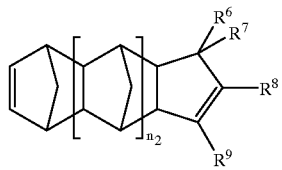

(3)

wherein
  $R^1$ represents H, methyl, ethyl or cyano;
  $R^2$ to $R^9$, independently of each other, represent H or a $C_1$–$C_6$-alkyl, $C_1$–$C_6$-alkenyl or $C_6$–$C_{10}$-aryl group;
  $R^2$ and $R^3$ together may also represent an alkylidene group and
  $R^8$ and $R^9$ together may also represent the remainder of a benzene ring;
  $n_1$ is 1 or 2;
  $n_2$ is 0, 1 or 2,
which contains 99.5 to 5 wt. % of the cyano-substituted norbornene incorporated by polymerisation and in which at least 60% of the initially present olefinic double bonds have been saturated by hydrogenation.

2. Hydrogenation products according to claim 1, in which
  $R^1$ represents H or methyl;
  $R^2$ to $R^9$, independently of each other, represent H, methyl or phenyl;
  $R^2$ and $R^3$ together represent ethylidene;
  $R^8$ and $R^9$ together represent the remainder of a benzene ring;
  $n_1$ is 1,
  $n_2$ is 0 or 1
with a content of cyano-substituted norbornene of 60% to 20% incorporated by polymerisation and with hydrogenation of at least 95% of the olefinic double bonds.

3. The hydrogenation product of claim 1, comprising a ring-opened copolymer of 5-cyanonorbornene and tetracyclododecane.

4. The hydrogenation product of claim 3, wherein the 5-cyanonorbornene and tetracyclododecane are reacted in a molar ratio of about 60:40.

5. The hydrogenation product of claim 1, comprising a ring-opened copolymer of 5-cyanonorbornene and tetracyclododecene.

6. The hydrogenation product of claim 5, wherein the 5-cyanonorbornene and tetracyclododecene are reacted in a molar ratio of about 80:20.

7. The hydrogenation product of claim 1, comprising a ring-opened copolymer of 5-cyanonorbornene and dicyclopentadiene.

8. The hydrogenation product of claim 7, wherein the 5-cyanonorbornene and dicyclopentadiene are reacted in a molar ratio of about 80:20.

9. The hydrogenation product of claim 1, comprising a ring-opened copolymer of 5-cyanonorbornene and 7-ethylidene-tetracyclododecene.

10. The hydrogenation product of claim 9, wherein the 5-cyanonorbornene and 7-ethylidene-tetracyclododecene are reacted in a molar ratio of about 80:20.

11. A substrate for optical data storage comprising the hydrogenation product of claim 1.

12. A substrate for optical data storage comprising the hydrogenation product of claim 2.

* * * * *